July 17, 1923.

Re. 15,654

E. E. CLARK

LINGERIE CLIP

Original Filed March 22, 1920

INVENTOR

Emma E. Clark

BY Bates & Macklin

ATTYS

Reissued July 17, 1923.

Re. 15,654

UNITED STATES PATENT OFFICE.

EMMA EVANS CLARK, OF HAMMOND, INDIANA, ASSIGNOR TO THE WILSON FASTENER COMPANY, OF CLEVELAND, OHIO, A CORPORATION OF OHIO.

LINGERIE CLIP.

Original application filed March 22, 1920, Serial No. 367,913. Renewed May 14, 1921, Serial No. 469,495. Original No. 1,383,906, dated July 5, 1921. Application for reissue filed March 24, 1923. Serial No. 627,458.

*To all whom it may concern:*

Be it known that I, Mrs. Emma Evans Clark, a citizen of the United States, residing at Hammond, in the county of Lake and State of Indiana, have invented new and useful Improvements in Lingerie Clips, of which the following is a specification.

This invention relates to a lingerie clip and has for its primary object the construction of a device of this character that will snap into fastened condition thereby preventing any chance of the clip becoming accidentally unfastened.

An object of the invention is the novel manner of constructing the limbs of the body with co-acting members so that the pressure of the thumb and finger may readily snap the limbs into locking engagement.

More specifically, it is a feature of this invention to provide on the limbs of a continuous resilient U-shaped strip, snap fastening means of the stud and socket type carried on the inner faces of such limbs adjacent their free ends, the snap fastening means being formed either of the material of the limbs or suitably secured thereto, as by soldering or electric welding. In either case, the snap fastening means is preferably of no greater width than that of the limbs of the body, whereby it is hidden from view by one of such limbs.

A further feature of the invention is the novel arrangement of the shield so as to prevent any material from catching between the limbs.

With these and other objects in view the invention may be readily understood from the following detailed description taken in connection with the accompanying drawing wherein.

Figure 1:
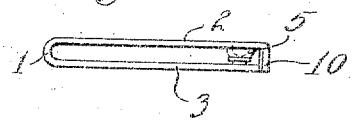
Figure 1 is a side elevation of the clip constructed in accordance with my invention.
Figure 2:
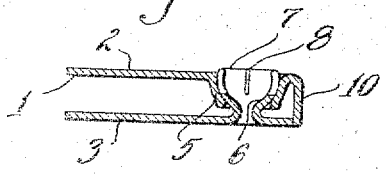
Fig. 2 is an enlarged sectional view through a portion of the clip.
Figure 3:
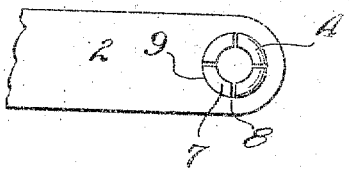
Fig. 3 is a top plan view of a portion of the clip.

Again referring to the drawing it will be noted that my invention consists of a U-shaped body portion 1. Limbs 2 and 3 are tensioned in a manner to automatically move away from each other. A snap fastener 4 is arranged between the limbs and is of such a construction that when the limbs are forced toward each other by the thumb and finger of the user thus the snap fastener will automatically lock for holding the limbs against movement. One manner of constructing this snap fastener is clearly illustrated in Figs. 1 to 3 inclusive as consisting of a hollow spherical member 5 stamped from limb 2 and provided with entrance opening 6. This member 5 forms the socket element of the snap and is shaped to snugly receive the ball member 7, which is formed on the other limb. This ball element is slotted at spaced points as illustrated at 8 so as to provide a plurality of tongues 9 which resiliently give when moving through the opening 6 and then snap into engagement with the interior of the member 5 for locking the members together. Thus it will be seen that in a simple inexpensive manner I am able to snap the limbs into engagement with each other. To increase the valuation of my invention I have shown a shield 10 stamped from the limb 2 and of a shape to overlap the end of the limb 3 so as to prevent any material from working in between the snap.

Figure 4:
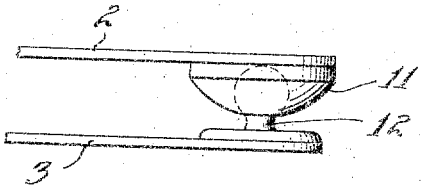
Fig. 4 is a detailed view of a modified form of my invention.

In Fig. 4 I have shown a commercial form of snap fastener secured to the U-shaped body portion. This snap consists of a female member 11 soldered or electric welded to the limb 2, and a male member 12 secured in a similar manner to the limb 3.

From the foregoing description taken in connection with the accompanying drawing it will be apparent that I provide a device of simple inexpensive construction which will hold effectively together the shoulder straps of various articles of lingerie, and will, when in locked position, positively be held against accidental unfastening.

It is of course, to be understood that the invention may be constructed in various other manners and the parts associated in different relations and, therefore, I do not desire to be limited in any manner except as set forth in the claims hereunto appended.

Having thus described my invention, what I claim is:—

1. A lingerie-clip comprising a U-shaped resilient body with a snap fastener of the stud and socket type carried respectively by the two limbs of the body entirely between such limbs and adjacent the free edges thereof.

2. A lingerie-clip comprising a U-shaped resilient body and snap fastening means carried thereby and comprising a stud located on the inner face of one limb of the body adjacent the free edge, and a socket located on the inner face of the other limb of the body adjacent the free edge.

3. A lingerie-clip comprising a single narrow flat strip of spring metal bent into a U-shape and a snap fastener of the stud and socket type having its stud projecting inwardly and mounted on the inner face of one of the limbs and having its socket projecting inwardly and mounted on the inner face of the other limb.

4. A lingerie-clip comprising a free resilient U-shaped flat strip of metal and a snap fastener of commercial form having its stud attached to the inner face of one of the limbs and having its socket attached to the inner face of the other limb, said limbs extending across the outer faces of such socket members.

5. A lingerie-clip comprising a U-shaped resilient body with a snap fastener carried by the two limbs of the body adjacent their free edges and comprised entirely between such two limbs, said snap fastener being of no greater extent than the width of the U-shaped body, whereby the same may be hidden from view by said limbs.

6. A lingerie-clip comprising a resilient U-shaped flat strip of metal and a snap fastener of the stud and socket type having its stud formed with a base attached to the inner face of one of the limbs and having its socket attached to the inner face of the other limb, the extreme diameter of said socket and base being no greater than the width of the limbs, said limbs extending across the outer faces of such socket members.

7. A lingerie-clip comprising a U-shaped resilient body, and a snap fastener having one element pressed from one limb and the other element pressed from the other limb.

8. A lingerie-clip comprising a U-shaped body of resilient material, one of the limbs being stamped to form a spherical socket member and the other limb stamped to form a spherical ball member slotted at spaced points so as to snap into the socket member.

9. A lingerie-clip comprising a U-shaped resilient body, a snap fastener having one element connected to one limb and the other element connected to the other limb, and a shield connected to one limb overlapping the other limb.

10. A lingerie-clip comprising a U-shaped body of resilient material, one of the limbs being stamped to form a spherical socket member and the other limb stamped to form a spherical ball member slotted at spaced points so as to snap into the socket member, and a shield bent from one limb and overlapping the end of the other limb when the ball and socket are in engagement.

In testimony whereof I affix my signature.

EMMA EVANS CLARK.